United States Patent
Korenaga (10) Patent No.: US 10,253,720 B2
(45) Date of Patent: Apr. 9, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shingo Korenaga, Shizuoka (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 354 days.

(21) Appl. No.: 15/162,783

(22) Filed: May 24, 2016

(65) Prior Publication Data

US 2017/0138294 A1 May 18, 2017

(30) Foreign Application Priority Data

Jul. 23, 2015 (JP) ................. 2015-145824

(51) Int. Cl.
*F01N 3/00* (2006.01)
*F02D 43/04* (2006.01)
(Continued)

(52) U.S. Cl.
CPC ............ *F02D 43/04* (2013.01); *F01N 3/101* (2013.01); *F01N 3/206* (2013.01); *F01N 11/007* (2013.01); *F02D 41/025* (2013.01); *F02D 41/0235* (2013.01); *F02D 41/0275* (2013.01); *F02D 41/1454* (2013.01); *F02P 5/15* (2013.01); *F01N 2570/14* (2013.01); *Y02T 10/22* (2013.01); *Y02T 10/26* (2013.01)

(58) Field of Classification Search
CPC .... F01N 11/007; F01N 2570/14; F01N 3/101; F01N 3/206; F02D 41/0235; F02D 41/1454; F02D 43/04

USPC ................. 60/285, 295, 297, 301
See application file for complete search history.

(56) References Cited

U.S. PATENT DOCUMENTS 5,775,099 A 7/1998 Ito et al.
7,963,101 B2 * 6/2011 Suzuki .................. F01N 3/0814
60/285

(Continued)

FOREIGN PATENT DOCUMENTS

JP H08218918 A 8/1996
JP H10176522 A 6/1998

(Continued)

*Primary Examiner* — Phutthiwat Wongwian
*Assistant Examiner* — Diem Tran
(74) *Attorney, Agent, or Firm* — Hunton Andrews Kurth LLP (57) ABSTRACT

A control device for an internal combustion engine for preventing a deterioration in exhaust characteristics when a change to an air-fuel ratio on a theoretical air-fuel ratio side is requested in an internal combustion engine during operation in a lean mode. The control device controls an internal combustion engine equipped with a NOx storage-reduction catalyst in an exhaust passage. When a NOx amount stored in the NOx storage-reduction catalyst reaches a release threshold value, the control device executes rich control to cause the NOx to be released. In a state in which an air-fuel ratio of an air-fuel mixture belongs to a second region that is near a lean limit, the release threshold value for determining the start of the rich control is set in the vicinity of the NOx storage capacity of the NOx storage-reduction catalyst.

4 Claims, 5 Drawing Sheets

(51) Int. Cl.

| | |
|---|---|
| *F02D 41/02* | (2006.01) |
| *F01N 3/10* | (2006.01) |
| *F01N 3/20* | (2006.01) |
| *F01N 11/00* | (2006.01) |
| *F02D 41/14* | (2006.01) |
| *F02P 5/15* | (2006.01) |

(56) References Cited

U.S. PATENT DOCUMENTS

2011/0202230 A1\*  8/2011  Sawada .............. B01D 53/9409
                                                                  701/29.2
2015/0345358 A1   12/2015  Sakurai et al.

FOREIGN PATENT DOCUMENTS

| JP | 2000-170573 A | 6/2000 |
|---|---|---|
| JP | 2004076668 A | 3/2004 |
| JP | 2009-167916 A | 7/2009 |
| WO | 2014128860 A1 | 8/2014 |

\* cited by examiner

CONTROL DEVICE FOR INTERNAL COMBUSTION ENGINE

CROSS-REFERENCE TO RELATED APPLICATION

The present application claims priority to Japanese Patent Application No. 2015-145824 filed on Jul. 23, 2015, which is incorporated herein by reference in its entirety.

BACKGROUND OF THE INVENTION

Field of the Invention

Embodiments of the present invention relate to a control device for an internal combustion engine. More particularly, embodiments of the present invention relate to a control device that is suitable as a control device for an internal combustion engine for use in a vehicle having an operation mode that uses lean combustion.

Background Art

An internal combustion engine equipped with an NOx storage-reduction catalyst in an exhaust passage is disclosed in Japanese Patent Laid-Open No. 2000-170573. The aforementioned internal combustion engine can operate in a lean mode that makes the air-fuel ratio of an air-fuel mixture a lean air-fuel ratio. The exhaust gas of an internal combustion engine contains NOx. The NOx concentration of the exhaust gas is determined by the air-fuel ratio of the air-fuel mixture, and becomes to be a high value in an air-fuel ratio region on a lean side relative to the theoretical air-fuel ratio.

More specifically, the NOx concentration in exhaust gas reaches a maximum at an air-fuel ratio that slightly exceeds the theoretical air-fuel ratio, that is, at an air-fuel ratio of about sixteen, and as the air-fuel ratio increases (becomes leaner) from that value, the NOx concentration in the exhaust gas decreases while maintaining a high value. Therefore, when operating an internal combustion engine in a lean mode, it is necessary to prevent the release of NOx into the atmosphere.

The NOx storage-reduction catalyst that the aforementioned internal combustion engine is equipped with can store NOx that is contained in exhaust gas, within the range of the storage capacity of the NOx storage-reduction catalyst. Consequently, the internal combustion engine can prevent the release of NOx into the atmosphere during operation in the lean mode.

The aforementioned internal combustion engine integrates NOx storage amounts that are stored in the NOx storage-reduction catalyst, and when the storage amount reaches a determination amount, it controls the air-fuel ratio of the air-fuel mixture to become temporarily enriched. Hereunder, the control is referred to as a "rich control". When the NOx storage-reduction catalyst receives a supply of exhaust gas having a rich air-fuel ratio, the NOx storage-reduction catalyst releases the stored NOx. Therefore, according to the aforementioned internal combustion engine, regeneration of the NOx storage-reduction catalyst can be performed before the NOx storage-reduction catalyst reaches a state of NOx saturation. NOx that is released accompanying execution of the rich control is reduced by HCs and the like contained in the rich exhaust gas, and is released into the atmosphere in a purified state. Therefore, according to the aforementioned internal combustion engine, release of NOx into the atmosphere can be continuously prevented without impairing the exhaust gas purification characteristics.

LIST OF RELATED ART

Following is a list of patent literatures which the applicant has noticed as related arts of the present invention.
[Patent Literature 1]
  Japanese Patent Laid-Open No. 2000-170573
[Patent Literature 2]
  Japanese Patent Laid-Open No. 2009-167916

Problem to be Solved by Embodiments of the Invention

In order to improve the fuel consumption characteristics of the internal combustion engine disclosed in Japanese Patent Laid-Open No. 2000-170573, it is desirable to make an air-fuel ratio that is normally used in the lean mode an air-fuel ratio in the vicinity of an upper limit (lean limit) of the air-fuel ratios at which combustion can be ensured. As described above, the NOx concentration in exhaust gas in a lean region decreases as the air-fuel ratio increases. Accordingly, with respect to suppressing the amount of NOx emissions from the internal combustion engine, it is desirable that the air-fuel ratio is a value in the vicinity of the lean limit.

Furthermore, in the above described internal combustion engine, to obtain favorable fuel consumption characteristics, it is also important to reduce the frequency of rich control which is accompanied by a large amount of fuel consumption. To achieve this, it is necessary to suppress to the required minimum a margin between a NOx storage amount at which the start of rich control is requested and the storage capacity of the NOx storage-reduction catalyst.

In the aforementioned internal combustion engine, when the start of the rich control is instructed, the air-fuel ratio of the air-fuel mixture that is supplied to the internal combustion engine is enriched. Subsequently, following a delay of a certain period thereafter, enriched exhaust gas arrives at the NOx storage-reduction catalyst. During the delay period, lean exhaust gas, that is, exhaust gas that contains a large amount of NOx, flows into the NOx storage-reduction catalyst. If the above described margin is larger than a NOx amount that flows into the NOx storage-reduction catalyst during the delay period, NOx will not be blown by to downstream of the NOx storage-reduction catalyst. Therefore, it is necessary that the aforementioned margin is set so as to cover a NOx amount that flows into the NOx storage-reduction catalyst during the delay period.

The NOx inflow amount is determined by the NOx concentration in the exhaust gas that is discharged from the internal combustion engine during the lean mode as well as a time period of the aforementioned delay that is specific to the internal combustion engine and the like. It is desirable that the NOx concentration in the exhaust gas is set while taking the air-fuel ratio that is normally used during the lean mode as a premise. Accordingly, if it is assumed that an air-fuel ratio in the vicinity of the lean limit is normally used during the lean mode, it is desirable that the aforementioned margin is determined on the premise that an air-fuel ratio in the vicinity of the lean limit will be used.

However, in an internal combustion engine, in some cases it is required to change the air-fuel ratio to correspond to various situations. In the internal combustion engine disclosed in Japanese Patent Laid-Open No. 2000-170573, during operation in the lean mode, a situation can arise in which it is required to shift from an air-fuel ratio in the vicinity of the lean limit to an air-fuel ratio that is further on the theoretical air-fuel ratio side. Furthermore, in the internal combustion engine, when an air-fuel ratio in the vicinity of the lean limit is shifted to the theoretical air-fuel ratio side, a situation can arise in which the NOx concentration in the exhaust gas largely rises and the NOx inflow amount to the NOx storage-reduction catalyst increases rapidly. At such a time, if an amount of NOx that is near to the determination amount for requesting the start of the rich control is already stored in the NOx storage-reduction catalyst, during a time lag until regeneration begins, a situation arises in which NOx is blown by from the NOx storage-reduction catalyst. Thus, in the internal combustion engine disclosed in Japanese Patent Laid-Open No. 2000-170573, in a case where the air-fuel ratio is shifted to the theoretical air-fuel ratio side during execution of the lean mode, there is a possibility that the exhaust characteristics will be deteriorated, albeit temporarily.

Embodiments of the present invention has been made to solve the above described problem, and an object of the embodiments of the present invention is to provide a control device that, does not cause a deterioration in the exhaust characteristics of an internal combustion engine, even when a request to change the air-fuel ratio to a theoretical air-fuel ratio side is made in the internal combustion engine operating in a lean mode.

SUMMARY

To achieve the above mentioned purpose, a first aspect of an embodiment of the present invention is a control device for an internal combustion engine that includes an NOx storage-reduction catalyst in an exhaust passage, wherein:

the control device executes rich control that makes an air-fuel ratio of an air-fuel mixture a rich air-fuel ratio to cause NOx that is stored in the NOx storage-reduction catalyst to be released;

an NOx storage amount in the NOx storage-reduction catalyst when the rich control is started in a state in which an air-fuel ratio of an air-fuel mixture belongs to a first region is less than an NOx storage amount when the rich control is started in a state in which the air-fuel ratio belongs to a second region;

the first region is an air-fuel ratio region on a lean side relative to a theoretical air-fuel ratio; and the second region is an air-fuel ratio region that is further on the lean side than the first region, and is an air-fuel ratio region in which a NOx concentration in exhaust gas of the internal combustion engine becomes lower than a NOx concentration in the first region.

A second aspect of an embodiment of the present invention is the control device for an internal combustion engine according to the first aspect discussed above, wherein:

a three-way catalyst is arranged in series with the NOx storage-reduction catalyst in the exhaust passage; and the first region is an air-fuel ratio region on a lean side relative to a purification window of the three-way catalyst.

A third aspect of an embodiment of the present invention is the control device for an internal combustion engine according to the first aspect discussed above, wherein the control device:

calculates the NOx storage amount by integrating NOx amounts that flow into the NOx storage-reduction catalyst;

executes the rich control upon the NOx storage amount reaching a release threshold value; and in a case where an air-fuel ratio of an air-fuel mixture belongs to the first region, makes the release threshold value a lower value in comparison to a case where the air-fuel ratio belongs to the second region.

A fourth aspect of an embodiment of the present invention is the control device for an internal combustion engine according to the third aspect discussed above, wherein the control device:

retards the ignition timing in accordance with the retardation request and also enriches an air-fuel ratio of an air-fuel mixture in a case where an ignition timing retardation request arises during operation in the second region; and lowers the release threshold value from a value for use in the second region to a value for use in the first region in a case where an air-fuel ratio after the enrichment belongs to the first region.

A fifth aspect of an embodiment of the present invention is the control device for an internal combustion engine according to the fourth aspect discussed above, wherein the control device:

generates a requested retardation amount for suppressing the increase in a case where an increase in an output torque of the internal combustion engine is predicted;

stores a relation between a retardation allowable amount of an ignition timing and an air-fuel ratio; and calculates an air-fuel ratio after the enrichment by applying the requested retardation amount to the retardation allowable amount in the relation.

A sixth aspect of and embodiment of the present invention is the control device for an internal combustion engine according to the fifth aspect discussed above, wherein the relation is a relation between the retardation allowable amount and an air-fuel ratio at which an air-fuel mixture can be appropriately combusted by means of an ignition timing in which the retardation allowable amount is reflected.

Advantages of Embodiments of the Present Invention

According to the first aspect discussed above, the internal combustion engine can operate using a lean air-fuel ratio that belongs to a first region and a lean air-fuel ratio that belongs to a second region. In the first region a NOx concentration in exhaust gas is higher compared to the second region. In a state in which the air-fuel ratio belongs to the first region, the rich control is started at a stage at which a NOx storage amount is small compared to a state in which the air-fuel ratio belongs to the second region. If the rich control is started at a stage at which a NOx storage amount is small, blow-by of NOx can be prevented even if the NOx concentration in exhaust gas is high. Therefore, according to the embodiments of the present invention, whether the lean air-fuel ratio that is being used belongs to the first region or belongs to the second region, favorable fuel consumption characteristics can be imparted to the internal combustion engine without impairing the exhaust characteristics.

According to the second aspect discussed above, in a case where an air-fuel ratio on a rich side relative to the first region is used, purification of exhaust gas by a three-way catalyst is achieved. In an air-fuel ratio region that deviates to a lean side from a purification window of the three-way catalyst, similarly to the case of the first aspect discussed above, favorable fuel consumption characteristics and exhaust characteristics can be imparted to the internal combustion engine, too.

According to the third aspect discussed above, by making a release threshold value that is used in the first region a low value relative to a release threshold value that is used in the second region, a timing at which rich control is started in the first region can be reliably advanced relative to a timing at which rich control is started in the second region.

According to the fourth aspect discussed above, in a case where a retardation request arises in the second region, the combustibility of an air-fuel mixture can be improved by enrichment of the air-fuel ratio. Consequently, the air-fuel mixture can be appropriately combusted irrespective of a deterioration in combustibility that accompanies retardation of the ignition timing. Further, in a case where the region of the air-fuel ratio changes from the second region to the first region accompanying the enrichment at such time, because the release threshold value is lowered, blow-by of NOx due to a delay in starting the rich control can also be reliably prevented.

According to the fifth aspect discussed above, enlargement of the output torque can be cancelled out by retardation of the ignition timing. Further, by applying the requested retardation amount to the previously stored relation between a retardation allowable amount and an air-fuel ratio, an appropriate air-fuel ratio can be calculated in accordance with the ignition timing after retardation. Therefore, according to embodiments of the present invention, the air-fuel ratio of the air-fuel mixture can be appropriately controlled while appropriately absorbing changes in the output torque.

According to the sixth aspect discussed above, while appropriately absorbing changes in the output torque by retardation of the ignition timing, the air-fuel mixture can be controlled to an air-fuel ratio with which appropriate combustion is obtained by means of the ignition timing after the retardation. Therefore, according to embodiments of the present invention, the internal combustion engine that is operating under a lean air-fuel ratio can be caused to continue operating extremely smoothly.

DETAILED DESCRIPTION

First Embodiment

[Configuration of First Embodiment]

Figure 1:
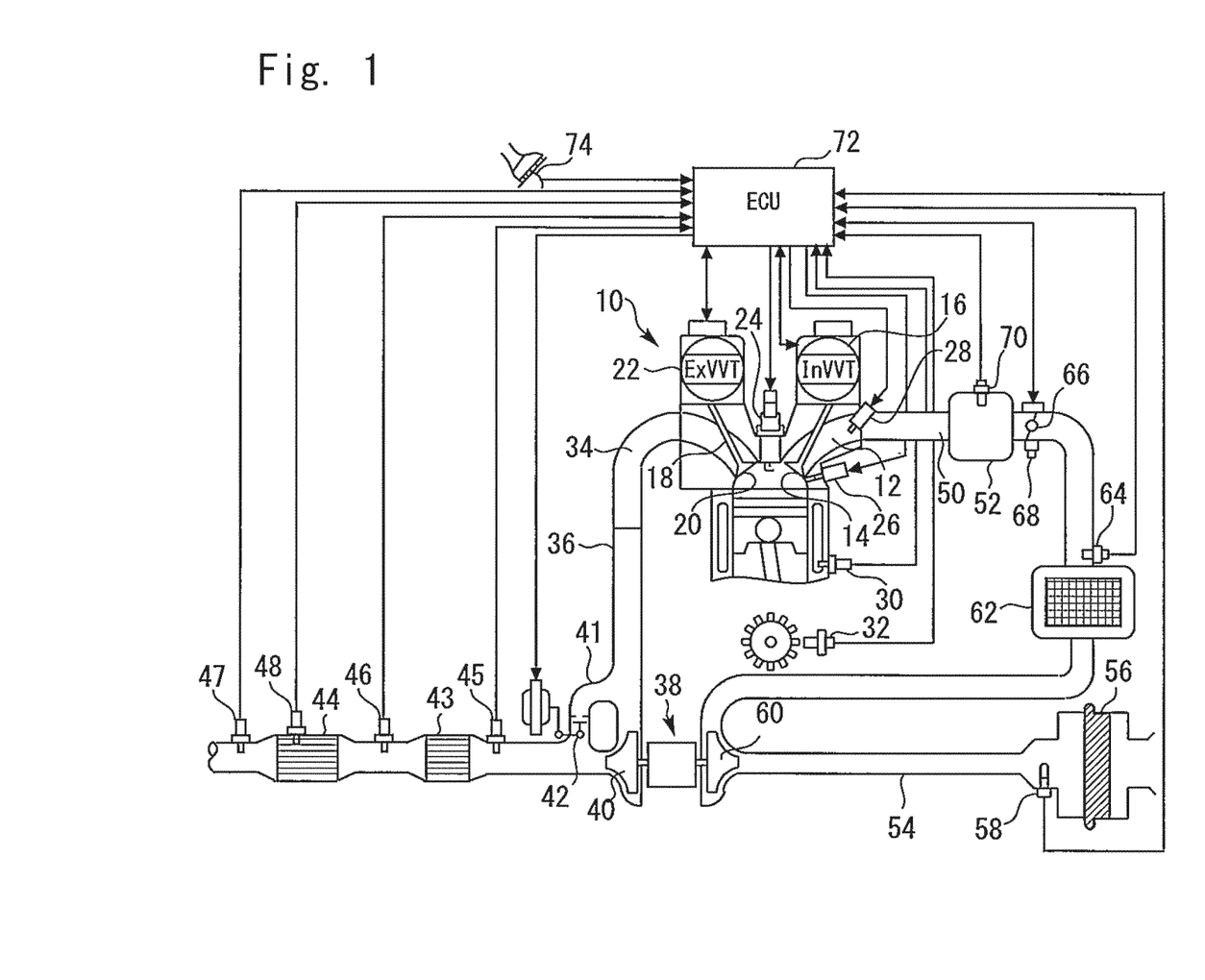
FIG. 1 is a diagram for explaining the configuration of a system according to a first embodiment of the present invention.

FIG. 1 illustrates a configuration of a first embodiment of the present invention. The present embodiment includes an internal combustion engine 10. The internal combustion engine 10 is equipped with, on an intake port 12 side, an intake valve 14 which is driven by a variable valve timing mechanism (hereunder, referred to as "InVVT") 16. Further, on an exhaust port 18 side, the internal combustion engine 10 is equipped with an exhaust valve 20 which is driven by a variable valve timing mechanism (hereunder, referred to as "ExVVT") 22. The InVVT 16 and ExVVT 22 can change the actuation timing of the intake valve 14 and the exhaust valve 20, respectively.

For each cylinder, the internal combustion engine 10 includes a spark plug 24, an in-cylinder injection valve 26 and a port injection valve 28. In addition, a water temperature sensor 30 and a crank angle sensor 32 are mounted in the internal combustion engine 10. A rotation speed Ne of the internal combustion engine 10 can be detected by the crank angle sensor 32.

The exhaust port 18 of the internal combustion engine 10 communicates with an exhaust manifold 34. The exhaust manifold 34 communicates with an exhaust passage 36. The exhaust passage 36 communicates with a turbocharger 38 at a turbine 40 thereof. The exhaust passage 36 also includes a bypass passage 41 that bypasses the turbine 40. The bypass passage 41 is equipped with a waste gate valve 42. A three-way catalyst 43 and a NOx storage-reduction catalyst (NSR catalyst) 44 are arranged downstream of the turbine 40 and the bypass passage 41.

An air-fuel ratio sensor 45 is arranged upstream of the three-way catalyst 43. The air-fuel ratio sensor 45 generates a linear signal with respect to the air-fuel ratio. An oxygen sensor 46 is arranged downstream of the three-way catalyst 43. The oxygen sensor 46 outputs a signal that, taking the theoretical air-fuel ratio as a boundary, changes stepwise between a lean side and a rich side. A NOx sensor 47 that emits a signal in accordance with the NOx concentration is arranged downstream of the NSR catalyst 44. A catalyst temperature sensor 48 that emits a signal in accordance with a catalyst bed temperature is mounted on the NSR catalyst 44.

The intake port 12 of the internal combustion engine 10 communicates with an intake manifold 50 and a surge tank 52. The surge tank in turn communicates with an intake passage 54. An air flow meter 58 for detecting an intake air amount Ga is provided in the intake passage 54 at a position that is downstream of an air filter 56. A compressor 60 of the turbocharger 38 is arranged downstream of the air flow meter 58. An intercooler 62, a turbocharging pressure sensor 64 and an electronically controlled throttle valve 66 are arranged downstream of the compressor 60.

A throttle opening degree sensor 68 is provided in the vicinity of the throttle valve 66. An intake air pressure sensor 70 that is mounted on the surge tank 52 is arranged downstream of the throttle valve 66.

The present embodiment includes an electronic control unit (hereunder, referred to as "ECU") 72. In addition to the above described various sensors and actuators, an accelerator opening degree sensor 74 is also connected to the ECU 72. The ECU 72 can detect a requirement of a driver based on the output of the accelerator opening degree sensor 74.

[Operations in First Embodiment]
(Lean Mode Operation)

Figure 2:
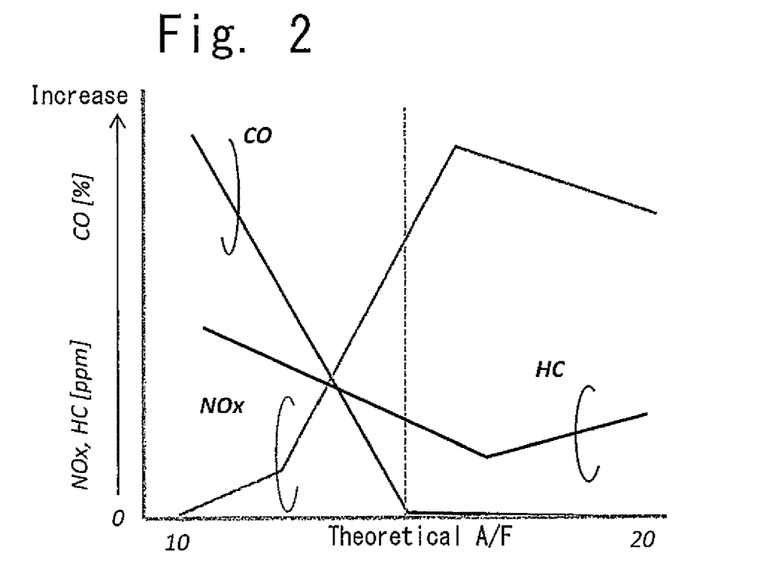
FIG. 2 illustrates a relation between an air-fuel ratio and component concentrations in exhaust gas of an internal combustion engine.

FIG. 2 illustrates a relation between an air-fuel ratio of an air-fuel mixture and component concentrations in exhaust gas. As shown in FIG. 2, a CO concentration in exhaust gas becomes almost zero in a lean region relative to the theoretical air-fuel ratio, while in a rich region relative to the theoretical air-fuel ratio the CO concentration increases as the air-fuel mixture becomes richer. Further, the concentration of HCs is liable to become high in the rich region, and is maintained at a comparatively low level in the lean region. The NOx concentration exhibits a peak at an air-fuel ratio of around sixteen that is slightly richer than the theoretical air-fuel ratio, and thereafter the NOx concentration gently decreases while maintaining a high value as the air-fuel ratio becomes leaner.

The three-way catalyst 43 of the internal combustion engine 10 has a purification window in the vicinity of the theoretical air-fuel ratio, and when the air-fuel ratio of the air-fuel mixture falls within that window the three-way catalyst 43 can purify all of CO, HCs and NOx. Hereunder, this air-fuel ratio region is referred to as a "theoretical air-fuel ratio region". Accordingly, by controlling the air-fuel ratio of the air-fuel mixture within the theoretical air-fuel ratio region, the exhaust characteristics of the internal combustion engine 10 can be maintained to be favorable due to the effect of the three-way catalyst 43.

The internal combustion engine 10 of the present embodiment performs lean mode operation that makes the air-fuel ratio of the air-fuel mixture a leaner value than the theoretical air-fuel ratio region. In a case where the air-fuel ratio of the air-fuel mixture is in a region that locates in the lean side from the theoretical air-fuel ratio region (hereunder, this region is referred to as a "lean region"), the CO concentration becomes almost zero and the HC concentration does not take a very high value. However, in the lean region, as shown in FIG. 2, the NOx concentration becomes a high value over the whole area thereof. Consequently, when the internal combustion engine 10 is operated in the lean mode, a situation arises in which NOx is blown by to downstream of the three-way catalyst 43.

In the present embodiment, to prevent atmospheric release of NOx blow discussed above, the NSR catalyst 44 is arranged downstream of the three-way catalyst 43. When the exhaust gas is lean, the NSR catalyst 44 can store NOx contained in the exhaust gas, within the limit of the storage capacity of the NSR catalyst 44. Therefore, according to the system illustrated in FIG. 1, as long as the NSR catalyst 44 has a capacity for storing NOx, the release of NOx into the atmosphere can be prevented.

The NOx storage amount inside the NSR catalyst 44 increases as operation in the lean mode is continued. If that state continues over a long period, eventually the NSR catalyst 44 reaches a state of NOx saturation. In the present embodiment, when the NOx storage amount inside the NSR catalyst 44 reaches a value that is just less than a value that causes NOx saturation, the internal combustion engine 10 temporarily makes the air-fuel ratio of the air-fuel mixture a rich value. Hereunder, the value is referred to as a "release threshold value", and the above control is referred to as "rich control". When the NSR catalyst 44 receives exhaust gas that is rich in fuel, the NSR catalyst 44 releases stored NOx. Consequently, when rich control is performed, NOx that is stored in the NSR catalyst 44 is released, and regeneration of the NSR catalyst 44 is achieved. At such time, the NOx that is released is reduced (purified) by CO and HCs included in the exhaust gas. Therefore, by appropriately executing the rich control, the internal combustion engine 10 can continuously prevent atmospheric release of NOx.

(Normal Air-Fuel Ratio in Lean Mode)

The leaner that the air-fuel ratio of the air-fuel mixture is, the greater the advantage with respect to improving the fuel consumption characteristics of the internal combustion engine 10. Further, as described above referring to FIG. 2, the NOx concentration in the lean region decreases as the air-fuel ratio becomes leaner. Accordingly, in terms of suppressing the speed of increase in the NOx storage amount in the NSR catalyst 44, the leaner the air-fuel ratio that is normally used in the lean mode is, the more desirable the situation is. Therefore, in the present embodiment, a value in the vicinity of a lean limit at which appropriate combustion is obtained (for example, around twenty-five to twenty-six) is adopted as the normal air-fuel ratio in the lean mode.

(Release Threshold Value for NOx Storage Amount)

Figure 3:
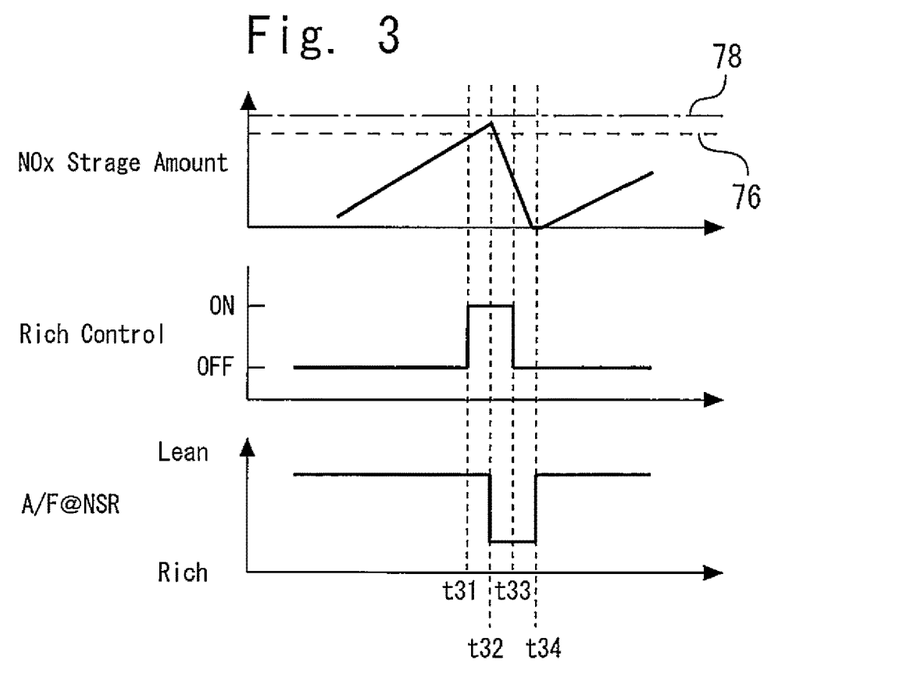
FIG. 3 is a timing chart for describing changes in the internal combustion engine shown in FIG. 1 when a rich control is executed therein.

FIG. 3 is a timing chart for describing operations of the present embodiment in a case where operation in the lean mode is continued using an air-fuel ratio in the vicinity of the lean limit. In FIG. 3, a broken line denoted by reference numeral 76 represents the "release threshold value" for determining the start of the rich control. Further, an alternate long and short dashed line denoted by reference numeral 78 represents the "NOx storage capacity" of the NSR catalyst 44.

In the example illustrated in FIG. 3, at a time t31, the NOx storage amount reaches the release threshold value 76, and an instruction is issued to start the rich control. When the instruction to start the rich control is issued, the air-fuel mixture of the internal combustion engine 10 is changed from a value in the vicinity of the lean limit to a rich air-fuel ratio. The enriched air-fuel mixture is combusted inside a combustion chamber, and thereafter, following a time lag of a certain amount, exhaust gas arrives at the NSR catalyst 44. As a result, in the example illustrated in FIG. 3, at a time t32, the air-fuel ratio at the NSR catalyst 44 inverts from lean to rich.

During a period from the time t31 at which the start of rich control is determined until the time t32 at which the air-fuel ratio at the NSR catalyst 44 changes to a rich air-fuel ratio, lean exhaust gas containing a high concentration of NOx continues to flow into the NSR catalyst 44. Therefore, the NOx storage amount continues to increase even after the time t31, and rapidly decreases after the release of NOx is started at the time t32.

In the system of the present embodiment, after the start of the rich control, when the NOx storage amount decreases as low as an ending threshold value, the rich control is ended. In the example illustrated in FIG. 3, an instruction to end the rich control is issued at a time t33. As a result, the air-fuel ratio of the air-fuel mixture is changed again to a value in the vicinity of the lean limit, and operation in the lean mode is resumed. Thereafter, at a time t34, the air-fuel ratio of exhaust gas flowing into the NSR catalyst 44 becomes lean again, and the NOx storage amount starts to increase once more.

As described above, even after a determination is made to start the rich control, exhaust gas containing a high NOx concentration continues to flow into the NSR catalyst 44 for the period of the aforementioned time lag. Consequently, a peak value of the NOx storage amount becomes a value that exceeds the release threshold value 76. If the aforementioned peak value exceeds the NOx storage capacity 78 of the NSR catalyst 44, NOx will be released into the atmosphere. Therefore, to avoid the occurrence of such a situation, it is necessary to set the release threshold value 76 so that a sufficient margin is secured between the release threshold value 76 and the NOx storage capacity 78.

On the other hand, if the value of the release threshold value 76 is too small, a determination to start the rich control may be made more often than necessary, and a situation will arise in which the frequency of executing the rich control will be unnecessarily high. A larger amount of fuel is consumed during execution of the rich control in comparison fuel consumption during operation in the lean mode. Therefore, unnecessarily repeat of the rich control is undesirable for giving a good fuel consumption characteristics to the internal combustion engine 10.

Based on the foregoing viewpoint, the release threshold value 76 for determining the start of the rich control is ideally a value that satisfies the following relation:

(Release threshold value 76)=(NOx storage capacity 78)−(NOx inflow amount during period from time $t31$ to $t32$)   (Equation 1)

Further, in the present embodiment, specifically, the release threshold value 76 is determined by the following method.

(Step 1) Setting the "NOx inflow amount during period from time t31 to t32" that is the second member on the right side of the equation on the basis that the air-fuel ratio is the normal air-fuel ratio in the lean mode, that is, an air-fuel ratio in the vicinity of the lean limit.

(Step 2) Setting a value that is slightly less than the value determined by the above (Equation 1) as the release threshold value 76 in order to ensure a safety margin.

According to the above described settings, the rich control is not executed at an unnecessarily high frequency. Further, NOx is prevented from being released into the atmosphere due to the NSR catalyst 44 after an instruction to start the rich control is issued. Therefore, according to the present embodiment, both favorable fuel consumption characteristics and favorable exhaust characteristics can be imparted to the internal combustion engine 10.

(Relation Between Ignition Retardation and Air-Fuel Ratio)

In the internal combustion engine 10, retardation of the ignition timing may be requested in various situations. For example, in a case where torque shock accompanying operation of an automatic transmission is predicted, retardation of the ignition timing may be requested to absorb the shock. Further, in some cases retardation of the ignition timing is requested for the purpose of warming up a catalyst at an early stage. Such retardation may be requested during operation in the lean mode.

Figure 4:
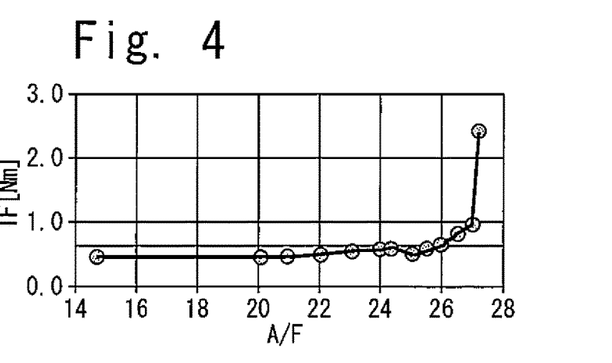
FIG. 4 illustrates a relation between an air-fuel ratio and torque fluctuations that arise in the internal combustion engine shown in FIG. 1.

FIG. 4 illustrates a relation between the air-fuel ratio and TF (Torque Fluctuations), that is, fluctuations which arise in the torque of the internal combustion engine 10. As shown in FIG. 4, TF of the internal combustion engine 10 steeply increases in the region having an air-fuel ratio over twenty-six. In the lean mode, an air-fuel ratio that is just less than a value at which such an increase occurs is normally used as the air-fuel ratio right under the lean limit. That is, in the present embodiment, operation in the lean mode is performed using a necessity minimum of an air-fuel ratio to ensure stable combustion.

The combustibility of the air-fuel mixture deteriorates as the ignition timing is retarded from MBT (Minimum advance for the Best Torque). Consequently, if the ignition timing is simply retarded during operation at an air-fuel ratio right under the lean limit, TF of the internal combustion engine 10 will be deteriorated.

Figure 5:
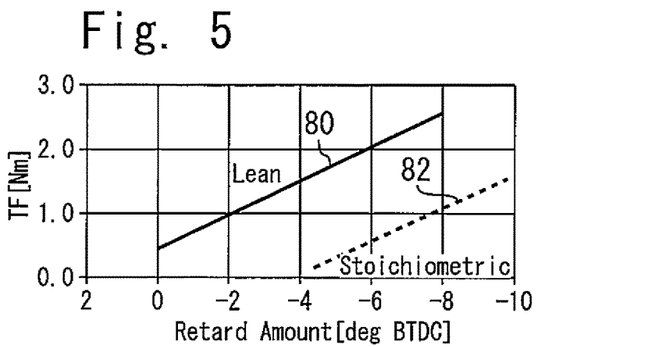
FIG. 5 is a view illustrating relations between torque fluctuations and retardation amounts of ignition timings of the internal combustion engine, which view showing a contrast between a case where the air-fuel ratio is lean and a case where the theoretical air-fuel ratio is used.

FIG. 5 is a view illustrating the relation between TF and the retardation amount of the ignition timing of the internal combustion engine 10 that shows a contrast between a case where the air-fuel ratio is lean and a case where the theoretical air-fuel ratio is used. In FIG. 5, a solid line denoted by reference numeral 80 represents TF in a case where the air-fuel ratio is lean. Further, a broken line denoted by reference numeral 82 represents TF when the theoretical air-fuel ratio is used.

The solid line 80 illustrated in FIG. 5 shows that, when the air-fuel ratio is lean, the TF start to deteriorate from a stage at which the ignition timing is retarded from MBT. In contrast, the broken line 82 shows that, in the case of the theoretical air-fuel ratio, a deterioration does not arise in the TF until around a point at which the retardation amount from MBT exceeds 4° C.A. As is clear from these tendencies, TF around the theoretical air-fuel ratio has a higher tolerance with respect to retardation of the ignition timing than TF right under the lean limit. Therefore, when a request to retard the ignition timing arises during operation in the lean mode, the present embodiment enriches the air-fuel ratio of the air-fuel mixture from a value right under the lean limit toward the theoretical air-fuel ratio side.

(NOx Increase Accompanying Enrichment of Air-Fuel Ratio)

Next, a problem that arises accompanying enrichment of the air-fuel ratio during operation in the lean mode will be described. In the following description, segmentation of the air-fuel ratio regions is in accordance with the following definitions.

"Theoretical air-fuel ratio region": A region that overlaps with the purification window of the three-way catalyst 43 (refer to the above description);

"Lean region": An adjacent region on the lean side of the theoretical air-fuel ratio region (refer to the above description);

"First region": A region that is in the lean region and that is adjacent to the theoretical air-fuel ratio region, and in which NOx is generated at a higher concentration than a second region that is described below; and "Second region": A region that is in the lean region and that is positioned between a lean-side boundary with the first region and the lean limit, and which is an air-fuel ratio region that is normally used in the lean mode.

Figure 6:
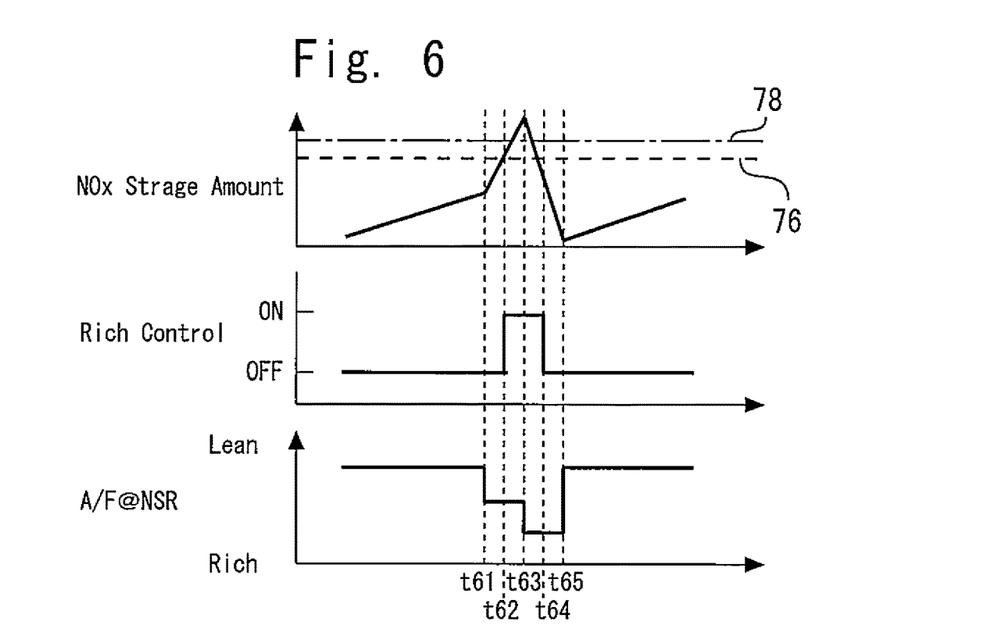
FIG. 6 is a timing chart for explaining a problem which should be solved in the internal combustion engine shown in FIG. 1.

FIG. 6 is a timing chart for describing a problem that arises when the air-fuel ratio is enriched in accordance with generation of a retardation request during operation in the lean mode. In the example shown in FIG. 6, the air-fuel ratio at the NSR catalyst 44 is maintained at an air-fuel ratio in the vicinity of the lean limit, that is, an air-fuel ratio belonging to the second region, until a time t61. Subsequently, at the time t61, the air-fuel ratio at the NSR catalyst 44 is enriched to the theoretical air-fuel ratio side by enrichment of the air-fuel ratio in accordance with retardation of the ignition timing. In this case, it is assumed that the air-fuel ratio changes from the second region to the first region as a result of the enrichment.

In a case where the air-fuel ratio changes in a rich direction in the lean region, the NOx amount in the exhaust gas increases (see FIG. 2). In particular, when the air-fuel ratio changes from the second region to the first region, the amount of NOx emissions noticeably increases. Therefore, in the example illustrated in FIG. 6, the increase rate of the NOx storage amount shows a high value at the time t61.

When the NOx storage amount reaches a release determination value (see, time t62), a determination to start the rich control is made at that time point. As a result, the air-fuel ratio at the NSR catalyst 44 changes to a rich air-fuel ratio after a predetermined time lag from time t62 (see, time t63) in the example illustrated in FIG. 6, Thereafter, release of NOx from inside the NSR catalyst 44 is started, and the NOx storage amount rapidly decreases.

In the above described operations, during the time lag from the time t62 to the time t63, the NOx storage amount increases at a high increase rate that is caused by an air-fuel ratio in the first region. The margin between the release threshold value 76 and the NOx storage capacity 78 is set on the assumption of a low rate of increase that is caused by an air-fuel ratio in the second region. Therefore, when an air-fuel ratio in the first region is used at the time t62, the NSR catalyst 44 may reaches a state of NOx saturation before the release of NOx is started, and consequently NOx may be released into the atmosphere. Accordingly, when an air-fuel ratio in the first region is used, it is necessary to employ some kind of technique to prevent the above described atmospheric release of NOx.

(Start Timing of Rich Control)

The reason why atmospheric release of NOx occurs when using an air-fuel ratio of the first region is that the margin between the release threshold value 76 and the NOx storage capacity 78 is too small. Accordingly, atmospheric release of NOx can be prevented by making the margin larger. Therefore, the present embodiment sets a new release threshold value that is smaller than the release threshold value 76 that is normally used when enrichment of the air-fuel ratio is requested during operation in the lean mode. When such a new release threshold value is set, the actual timing at which the release of NOx is started can be advanced, and atmospheric release of NOx can be appropriately prevented.

(Processing by Electronic Control Unit)

Figure 7:
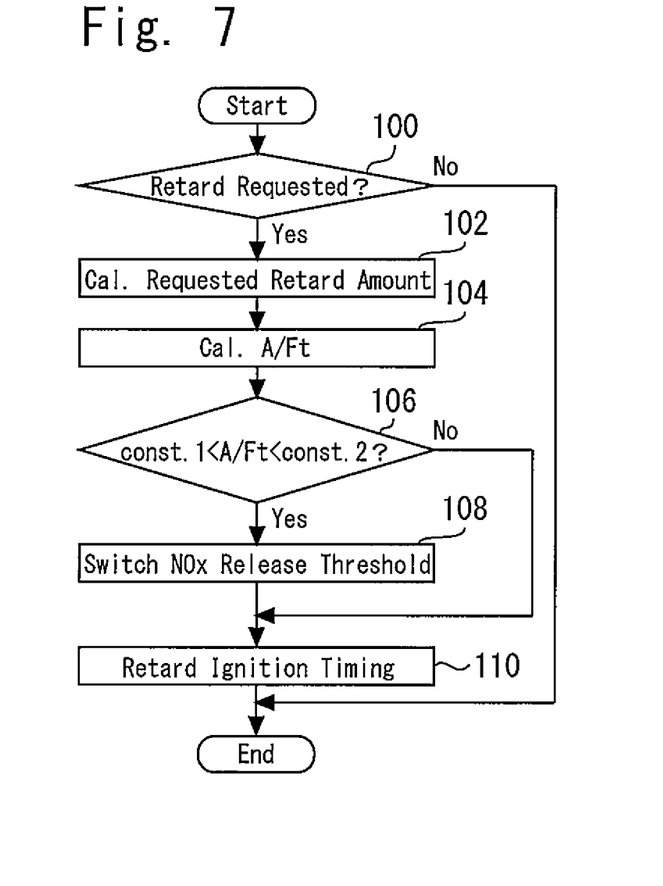
FIG. 7 is a flowchart illustrating a routine which is executed by an electronic control unit in the first embodiment of the present invention.

FIG. 7 is a flowchart illustrating a routine that the ECU 72 executes in the present embodiment to realize the above described function. The routine illustrated in FIG. 7 is started for each combustion cycle of the respective cylinders during operation in the lean mode. It should be noted that the ECU 72 executes other routine for operating the internal combustion engine 10 with an air-fuel ratio that belongs to the second region during operation in the lean mode.

When the routine illustrated in FIG. 7 is started, the ECU 72 determines whether or not a request to retard the ignition timing has arisen in the internal combustion engine 10 (step 100). As described above, a retardation request arises at a timing where gears of the automatic transmission is changed, there arises a necessary to increase the exhaust energy to warm up the engine at an early stage, or the like. If retardation of the ignition timing is requested due to some cause or other, the ECU 72 sets a retardation request flag to "on". In this step, the above described determination is made based on the state of the retardation request flag.

If the ECU 72 determines by means of the above described processing that a retardation request has not arisen, the current routine is terminated. On the other hand, if the generation of a retardation request is recognized, the ECU 72 calculates a requested retardation amount (step 102). The ECU 72 stores a logic for calculating a requested retardation amount for each cause of the request. In this step, the ECU 72 calculates a requested retardation amount that is appropriate for the cause that has arisen, in accordance with the aforementioned logic.

Figure 8:
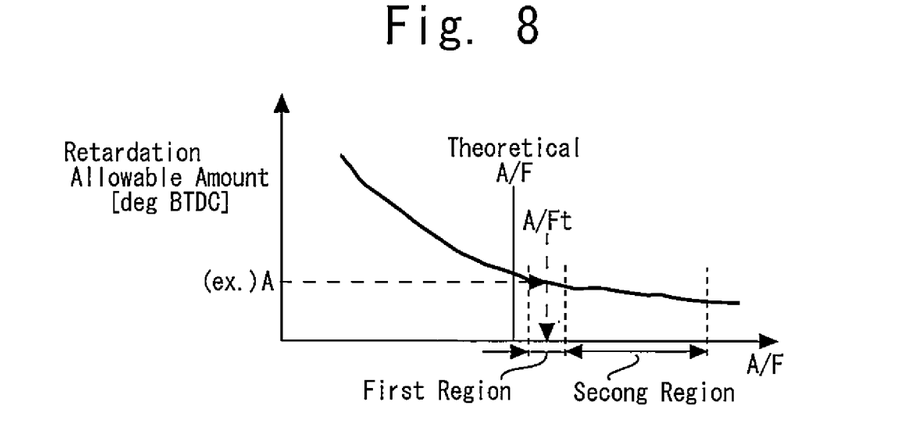
FIG. 8 is an example of a map which illustrates a relation between a retardation allowable amount and an air-fuel ratio.

Then, a target air-fuel ratio is calculated (step 104). FIG. 8 illustrates a relation between a retardation allowable amount from an MBT that can be realized in the internal combustion engine 10 and an air-fuel ratio. As shown in FIG. 8, the retardation allowable amount exhibits a tendency such that the amount decreases as the air-fuel ratio becomes leaner, that is, increases as the air-fuel ratio becomes richer. The ECU 72 stores a map corresponding to FIG. 8. In the present step 104, the ECU 72 applies the requested retardation amount (for example, "A") that is calculated in the above described step 102 to the vertical axis in FIG. 8, and calculates a target air-fuel ratio A/Ft by reading out the corresponding air-fuel ratio.

When the above described processing is executed, the ECU 72 then determines whether or not the target air-fuel ratio A/R belongs to the first region (step 106). The ECU 72 stores a lower limit air-fuel ratio (const. 1) and an upper limit air-fuel ratio (const. 2) of the first region. In this step, specifically, it is determined whether the target air-fuel ratio A/Ft is a value that falls between those two air-fuel ratios. Note that FIG. 8 illustrates an example in which the target air-fuel ratio A/Ft belongs to the first region.

If it is determined that the target air-fuel ratio A/Ft belongs to the first region, it can be determined that the region of the air-fuel ratio will be changed from the second region to the first region. That is, it can be predicted that the NOx storage amount will rapidly increase from the current time point onwards. In this case, the ECU 72 changes the NOx release threshold value to a smaller value relative to the release threshold value 76 shown in FIG. 3 or FIG. 6 in order to move up the start timing of the rich control (step 108). More specifically, the ECU 72 stores a release threshold value (84, see FIG. 9) that is set based on an air-fuel ratio in the first region as well as the release threshold value 76 that is set based on an air-fuel ratio in the second region. In this step, the ECU 72 sets the former threshold value 84 as an active threshold instead of the latter release threshold value 76.

On the other hand, if the judgment in the aforementioned step 106 is negative, it can be determined that the NOx increase rate will not show large increase accompanying a change in the air-fuel ratio. In this case, the processing in the aforementioned step 108 is skipped, and the release threshold value is maintained as it is at the value (76) for the second region.

After the above processing is terminated, finally, processing to retard the ignition timing is performed (step 110). According to the above described processing, it is possible to satisfy the request to retard the ignition timing without causing TF of the internal combustion engine 10 to deteriorate as well as to appropriately prevent NOx from being released in atmosphere.

(Comparison Between Operations in the First Region and Operations in the Second Region)

Figure 9:
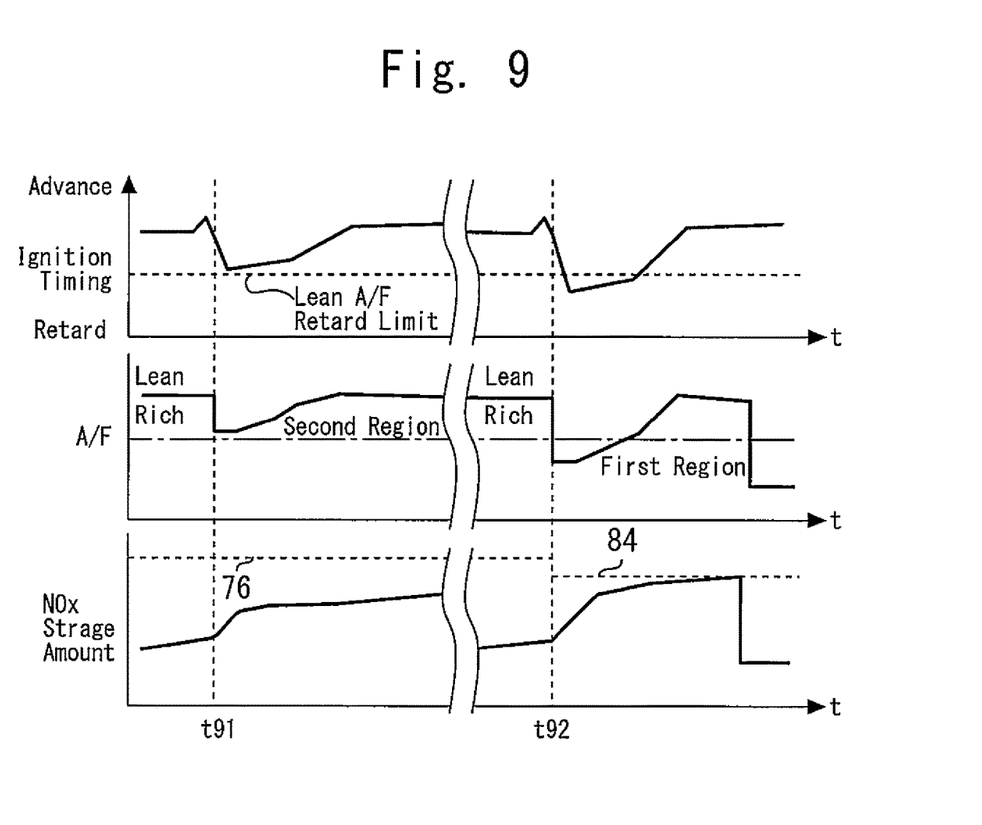
FIG. 9 is a timing chart for explaining an operation of the first embodiment of the present invention.

FIG. 9 is a timing chart that shows a comparison between operations in a case where the air-fuel ratio is maintained in the second region (time t91 to t92), and operations in a case where the air-fuel ratio enters the first region (from time t92 onward). As shown in FIG. 9, the present embodiment selectively uses two kinds of release threshold values 76 and 84 in accordance with whether the air-fuel ratio is maintained in the second region or enters the first region after being enriched accompanying retardation of the ignition timing. As described above, wasteful repetition of the rich control can be effectively eliminated by using the release threshold value 76. Further, atmospheric release of NOx can be appropriately prevented irrespective of enrichment of the air-fuel ratio by using the release threshold value 84.

[Modification of First Embodiment]

In the above described first embodiment, the active threshold is always changed from the release threshold value 76 to the release threshold value 84 in a case where the air-fuel ratio is enriched so as to enter the first region during operation in the lean mode. The present invention is not limited thereto. That is, the NOx storage amount may be checked when the air-fuel ratio is to be enriched. And, the release threshold value may be switched only in a case where it is expected that NOx emission amount that will be generated during a period in which the air-fuel ratio is enriched exceeds an available capacity of the NSR catalyst 44.

Further, although in the above described first embodiment a cause for requesting enrichment of the air-fuel ratio is limited to retardation of the ignition timing, the present invention is not limited thereto. In the internal combustion engine 10, enrichment of the air-fuel ratio may be requested in various situations, such as for the purpose of increasing the torque. The present invention can be applied to all situations in which the air-fuel ratio is enriched.

The invention claimed is:

1. A control device for an internal combustion engine that includes an NOx storage-reduction catalyst in an exhaust passage, wherein the control device is configured to:
 calculate an NOx storage amount by integrating NOx amounts that flow into the NOx storage-reduction catalyst: and
 executes execute rich control that makes an air-fuel ratio of an air-fuel mixture a rich air-fuel ratio to cause NOx that is stored in the NOx storage-reduction catalyst to be released upon the NOx storage amount reaching a release threshold value; wherein
 a first region is an air-fuel ratio region on a lean side relative to a theoretical air-fuel ratio; and
 a second region is an air-fuel ratio region that is further on the lean side than the first region, and is an air-fuel ratio region in which an NOx concentration in exhaust gas of the internal combustion engine becomes lower than an NOx concentration in the first region; wherein the control device is further configured to:
 retard an ignition timing in accordance with an retardation request and also enrich an air-fuel ratio of an air-fuel mixture in a case where an ignition timing retardation request arises during operation in the second region: and
 lowers the release threshold value from the value for use in the second region to a value for use in the first region in a case where an air-fuel ratio after the enrichment belongs to the first region.

2. The control device for an internal combustion engine according to claim 1, wherein:
 a three-way catalyst is arranged in series with the NOx storage-reduction catalyst in the exhaust passage; and
 the first region is an air-fuel ratio region on a lean side relative to a purification window of the three-way catalyst.

3. The control device for an internal combustion engine according to claim 1, wherein the control device is configured to:
 generate a requested retardation amount of the ignition timing for suppressing an increase in an output torque of the internal combustion engine in a case where the increase is predicted;
 store a relation between a retardation allowable amount of an ignition timing and an air-fuel ratio; and
 calculate an air-fuel ratio after the enrichment by applying the requested retardation amount to the retardation allowable amount in the relation.

4. The control device for an internal combustion engine according to claim 3, wherein the relation is a relation between the retardation allowable amount and an air-fuel ratio at which an air-fuel mixture is appropriately combusted by means of an ignition timing in which the retardation allowable amount is reflected.

* * * * *